Sept. 15, 1936.  J. POTHIER  2,054,468
LICENSE PLATE SECURING DEVICE
Filed Dec. 9, 1935
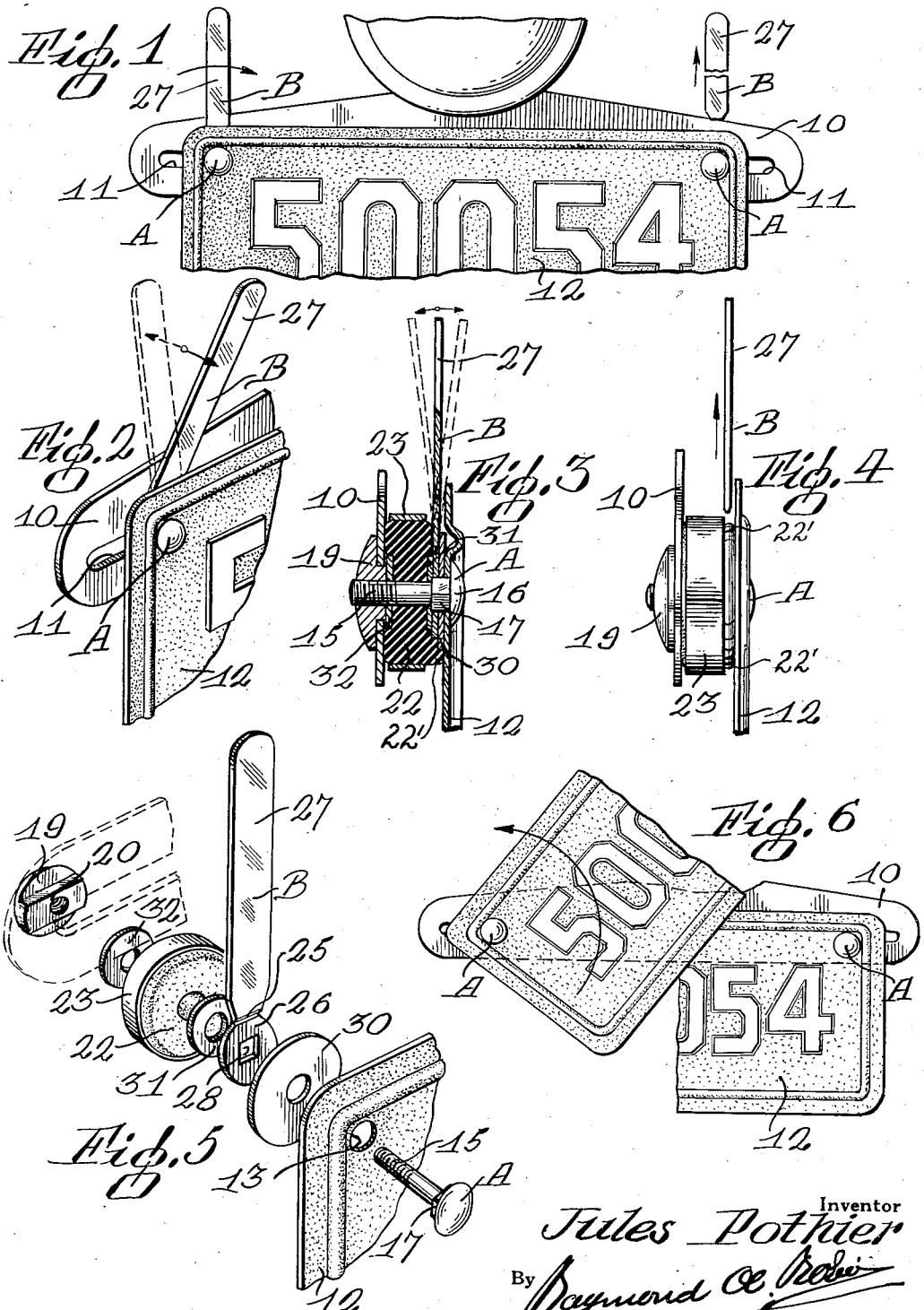
Inventor
Jules Pothier
By Raymond O. [illegible]
Attorney

UNITED STATES PATENT OFFICE 2,054,468

LICENSE PLATE SECURING DEVICE

Jules Pothier, Quebec, Quebec, Canada

Application December 9, 1935, Serial No. 53,500

4 Claims. (Cl. 40—125)

The present invention relates to improvements in license plate securing devices.

An object of the invention is the provision of license plate securing means designed so that, after mounting on a vehicle bracket, the plate cannot be detached without dividing and consequently mutilating the same.

Another object of the invention is the provision of license plate securing means which will prevent the use of plates on more than one automobile.

A further object of the invention is the provision of securing means of the above character which will obviate theft of the plate.

Still another object of the invention is the provision of license plate securing means constructed so as to prevent rattling of the plate.

A still further object of the invention is the provision of license plate securing means of the aforesaid character embodying a frangible fastening element which is to be broken off when the plate is properly fastened to obviate removal.

Other objects and advantages of the invention will become apparent as the description progresses.

In the accompanying drawing forming a part of this specification and in which like reference characters are employed to designate corresponding parts throughout the same:—

Figure 1 is a fragmentary front elevational view of a license plate mounted in position on the holder bracket of a vehicle, Figure 2 is a fragmentary perspective view of the same, Figure 3 is a section through the assembled securing device, Figure 4 is an end view of the assembled securing device with the key in broken off position, Figure 5 is a perspective view showing the securing device in separated arrangement, and Figure 6 is a front elevational view showing the license plate divided for removal from the holder.

Referring to the drawing, wherein for the purpose of illustration is shown a preferred embodiment of the invention, 10 designates a conventional form of license plate holding bracket commonly used on automobiles and provided adjacent the ends with elongated fastener engaging apertures 11. The most common form of license plate, indicated at 12, is provided with circular apertures 13 in the upper corner portions for connection with the holder bracket.

My improved securing device embodies a bolt A having an elongated threaded shank 15 formed at one end with a round convex head 16. Adjacent the head the shank is formed with an enlarged non-circular, in the present instance square, neck forming portion 17. The shank of the bolt is adapted to threadedly engage the interiorly threaded bore of a fastening nut 19 having a round convex head and a reduced non-circular, preferably oblong, boss 20.

On the intermediate portion of the securing bolt A is adapted to be mounted a packing ring 22 preferably formed of rubber or similar resilient material having fitted on its periphery a ring 23 of metal or the like, providing a resiliently compressed metal-covered assembly which cannot be disconnected or damaged by the use of tools, an important feature of the device, and which eliminates rattling of the assembled parts.

A tightening key B embodying an elongated flat bar of metal or the like is notched and scored to provide a weakened portion 25 between the inner head section 26 and the outer handle section 27. As shown to advantage at Figure 5, the head section 26 of the key is formed with a non-circular aperture 28 adapted to snugly engage the non-circular neck portion 17 of the bolt to act as a tightening spanner.

The fastening device is assembled by disposing the nut 19 against the rear portion of the license bracket 10 and extending the boss 20 through the aperture 11 at each end thereof. The oblong boss is adapted to effect non-rotary engagement with each aperture. The bolt A is then inserted through a corner aperture 13 of the license plate, the neck 17 extending through the aperture while the inner face of the head 16 will be disposed against the outer side of the plate, as illustrated at Figure 3. A thin metallic washer 30 is preferably disposed over the neck portion 17 of the bolt against the inner side of the plate and the key B disposed in proper arrangement by fitting the aperture 28 upon the neck 17 against the washer 30. A relatively small washer 31 is then preferably disposed against the opposite side of the key upon the bolt. The rubber spacing ring 22 is then slidably fitted on the intermediate portion of the bolt shank and a small washer 32 disposed against the outer side thereof.

This assembly is now disposed so that the outer threaded portion of the shank is disposed in registration with the aperture in the nut 19 and the key B, which assumes an approximately radial position, is rotated until the bolt is tightly fitted in the nut. When a tight connection has been effected the outer handle portion of the key is bent laterally in opposite directions, as shown in dotted lines at Figure 3, so as to break the key at the frangible portion 25 to enable disconnection of the outwardly extending handle portion thereof. As shown at 22' in Figures 3 and 4, the removal of the key will enable the compressed rubber to overlap the washers 30, 31 and the portion 26 of the key 27, thereby hiding the same from view. In consequence thereof, it is impossible to turn the bolt or nut without injuring the license plate.

To remove the license plate from the bracket it is necessary to sever the same transversely, as shown at Figure 6, and to rotate the respective divided sections in order to rotate the bolt and effect disconnection of the securing device.

It will be quite apparent that the necessity for thus mutilating the plate to effect removal will obviate the use of one set of license plates on more than one automobile and will also prevent unauthorized removal or theft of the plates.

It is to be understood that the form of my invention herein shown and described is to be taken as a preferred example of the same and that various changes as to the shape, size and arrangement of parts may be resorted to without departing from the spirit of the invention or the scope of the subjoined claims.

Having thus described my invention, I claim:—

1. A device of the character described comprising a holder having apertures, a plate having apertures in registering relation with those of the holder and adapted for mounting thereon, a nut and bolt connection in each of the plate apertures for securing the holder and plate together, and a key non-removably engaging the intermediate portion of each bolt to turn the same to effect connection with the nut, the said key being formed to be broken off after assembly to prevent removal of the plate without dividing the same.

2. A license plate securing device comprising an apertured holder bracket, an apertured license plate, a nut disposed in non-rotary position on the holder, a bolt extended through the aperture in the plate to engage the nut, and a key non-removably engaging the intermediate portion of the bolt and adapted to rotate the same for engagement with the nut, the said key having a weakened portion so that the outer handle section may be broken from the inner section when the device is assembled.

3. In a license plate securing device the combination with an apertured holder bracket and an apertured plate, of a nut mounted in non-rotary position on the bracket, a bolt extended through the aperture in the plate to threadedly engage the nut, the said bolt having a non-circular portion intermediate its ends, and a key having an aperture adjacent one end snugly engaging the non-circular portion of the bolt for turning the bolt and to effect tight assembly of the plate on the bracket.

4. In a license plate securing device the combination with an apertured holder bracket and an apertured plate, of a nut mounted in non-rotary position on the bracket, a bolt extended through the aperture in the plate to threadedly engage the nut, the said bolt having a non-circular portion intermediate its ends, a resilient ring fitted on the intermediate portion of the bolt between the plate and the bracket, and a key having a non-circular aperture at the inner end engaging the non-circular portion of the shank for tightly connecting the bolt with the nut, the said key having a weakened portion adjacent its inner end to enable breaking off the outer portion so as to secure the plate in such manner as to prevent removal without dividing the same.

JULES POTHIER.